(12) United States Patent
Brogaard et al.

(10) Patent No.: US 8,377,174 B2
(45) Date of Patent: Feb. 19, 2013

(54) GAS SPARGER FOR SUPPLYING OXIDATION GAS TO A WET SCRUBBER

(75) Inventors: Fredrik J. Brogaard, Vaxjo (SE);
Rikard Hakansson, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 431 days.

(21) Appl. No.: 12/812,349

(22) PCT Filed: Feb. 5, 2009

(86) PCT No.: PCT/EP2009/000790
§ 371 (c)(1),
(2), (4) Date: Jul. 9, 2010

(87) PCT Pub. No.: WO2009/098055
PCT Pub. Date: Aug. 13, 2009

(65) Prior Publication Data
US 2010/0294386 A1   Nov. 25, 2010

(30) Foreign Application Priority Data

Feb. 7, 2008 (EP) ..................................... 08151159

(51) Int. Cl.
*B01D 50/00* (2006.01)
(52) U.S. Cl. ................ 95/149; 95/187; 95/235; 96/228; 261/124; 423/242.1
(58) Field of Classification Search ............... 95/149, 95/187, 235; 96/228; 423/242.1, 243.08; 261/124
See application file for complete search history.

(56) References Cited

U.S. PATENT DOCUMENTS

| 4,818,445 A | 4/1989 | Onizuka et al. | |
|---|---|---|---|
| 5,824,141 A * | 10/1998 | Gohara et al. | ................... 96/235 |
| 6,013,120 A | 1/2000 | Gohara et al. | |

FOREIGN PATENT DOCUMENTS

| DE | 2829077 | 1/1980 |
|---|---|---|
| JP | 62 083024 | 4/1987 |
| JP | 62 258729 | 11/1987 |
| JP | 162544/88 | 12/1988 |
| JP | 05 296436 | 11/1993 |
| JP | 06 218227 | 8/1994 |

OTHER PUBLICATIONS

Japan Office Action dated Jan. 9, 2012.
PCT International Search Report and Written Opinion of the International Searching Authority dated May 27, 2009 (PCT/EP2009/000790).
European Search Report dated, Jul. 7, 2008.

* cited by examiner

*Primary Examiner* — Robert A Hopkins
(74) *Attorney, Agent, or Firm* — Rita D. Vacca

(57) ABSTRACT

A gas sparger (30) is operative for supplying an oxidation gas containing oxygen to a tank (18) of a wet scrubber which is operative for removing sulphur dioxide from a process gas by means of a slurry (S). The gas sparger (30) is provided with at least a first liquid supply nozzle (38), which is located inside an oxidation gas supply duct (32) and is operative for spraying a liquid containing water towards a first oxidation gas supply nozzle (44). The oxidation gas supply duct (32) has a characteristic cross-sectional measure, such as a diameter (D), at said first oxidation gas supply nozzle (44). The first liquid supply nozzle (38) is located a distance (L1) of maximum 5 times said characteristic cross-sectional measure (D) from said first oxidation gas supply nozzle (44).

9 Claims, 4 Drawing Sheets

GAS SPARGER FOR SUPPLYING OXIDATION GAS TO A WET SCRUBBER

FIELD OF THE INVENTION

The present invention relates to a gas sparger which is operative for supplying an oxidation gas containing oxygen to a tank of a wet scrubber which is operative for removing sulphur dioxide from a process gas by means of a slurry comprising at least one compound chosen from the group of compounds comprising calcium sulphite and calcium sulphate, said gas sparger comprising an oxidation gas supply duct and at least a first oxidation gas supply nozzle, which is operative for distributing the oxidation gas in the slurry of said tank.

The present invention further relates to a method of supplying an oxidation gas containing oxygen to a tank of a wet scrubber of the above mentioned type.

BACKGROUND OF THE INVENTION

In the combustion of a fuel, such as coal, oil, peat, waste, etc., in a combustion plant, such as a power plant, a hot process gas is generated, such a hot process gas, often referred to as a flue gas, containing, among other components, sulphur dioxide, $SO_2$. The sulphur dioxide is often removed in a so-called wet scrubber, in which the flue gas is brought into contact with a slurry containing, e.g., limestone. The slurry is recirculated from a recirculation tank of the wet scrubber. The sulphur dioxide is absorbed by the slurry, and reacts with the limestone to form calcium sulphite, $CaSO_3$. The calcium sulphite is not a desired end-product, and therefore an oxidation gas containing oxygen is supplied by means of one or several so-called gas spargers to the slurry of the recirculation tank. Typically, the oxidation gas containing oxygen is ambient air, but other gases, such as pure oxygen gas, can also be utilized. The oxygen reacts with the calcium sulphite of the slurry, and converts it to calcium sulphate, $CaSO_4$, i.e., gypsum.

A problem of the known gas spargers is that they tend to become clogged by solid calcium deposits, such as calcium sulphite and calcium sulphate, formed outside and inside of the gas spargers. Such clogging results in frequent maintenance work, which may cause interruptions of the operation of the wet scrubber.

SUMMARY OF THE INVENTION

An object of the present invention is to provide a gas sparger which is operative for supplying a gas containing oxygen to a wet scrubber operating with a slurry containing calcium sulphite and/or calcium sulphate and which requires less maintenance work than the known gas spargers.

This object is achieved by means of a gas sparger which is operative for supplying an oxidation gas containing oxygen to a tank of a wet scrubber which is operative for removing sulphur dioxide from a process gas by means of a slurry comprising at least one compound chosen from the group of compounds comprising calcium sulphite and calcium sulphate, said gas sparger comprising an oxidation gas supply duct and at least a first oxidation gas supply nozzle, which is operative for distributing the oxidation gas in the slurry of said tank, said gas sparger being provided with at least a first liquid supply nozzle, which is located inside said oxidation gas supply duct and is operative for spraying a liquid containing water towards said first oxidation gas supply nozzle, said oxidation gas supply duct having a characteristic cross-sectional measure, such as a diameter, at said first oxidation gas supply nozzle, said first liquid supply nozzle being located a distance of maximum 5 times said characteristic cross-sectional measure from said first oxidation gas supply nozzle.

An advantage of this gas sparger is that any compounds of the slurry, such as calcium sulphite and gypsum, are removed from the gas supply duct and from the first oxidation gas supply nozzle before having a chance to form hard deposits. Such hard deposits would have a tendency to build large aggregates that would, in time, hinder the proper flow of the oxidation gas. By the spraying of liquid inside the gas supply duct the formation of hard deposits is avoided, or is at least substantially decreased.

According to one embodiment of the present invention the oxidation gas supply duct is substantially straight between the location of said first liquid supply nozzle and the location of said first oxidation gas supply nozzle. An advantage of this embodiment is that the flushing effect of the sprayed liquid is improved, as the first liquid supply nozzle "sees" the location at which the first oxidation gas supply nozzle is located.

According to one embodiment of the present invention said gas sparger comprises a second liquid supply nozzle, said second liquid supply nozzle being located a distance of maximum 25 times said characteristic cross-sectional measure from said first liquid supply nozzle. An advantage of this embodiment is that the second liquid supply nozzle improves the flushing effect of oxidation gas supply nozzles that are located a certain distance from the first liquid supply nozzle. For a gas sparger comprising a very long gas supply duct it is possible to utilize also a third, a fourth etc. liquid supply nozzle, each of which is preferably located a distance of maximum 25 times said characteristic cross-sectional measure from the closest upstream liquid supply nozzle.

According to one embodiment said gas sparger comprises a drain pipe for draining liquid from said gas supply duct. An advantage of this embodiment is that liquid sprayed by means of the first liquid supply nozzle, and any deposits removed thereby, may be easily drained from the gas supply duct, without having to interfere with the oxidation gas supply nozzles.

According to one embodiment said first liquid supply nozzle is a nozzle having a spray angle of less than 100°. Nozzles with a rather low spray angle provide an efficient flushing also of oxidation gas supply nozzles located downstream of said first oxidation gas supply nozzle.

A further object of the present invention is to provide an efficient method of supplying a gas containing oxygen to a recirculation tank of a wet scrubber in a manner which reduces the downtime for maintenance of the components involved.

This object is achieved by means of a method of supplying an oxidation gas containing oxygen to a tank of a wet scrubber which is operative for removing sulphur dioxide from a process gas by means of a slurry comprising at least one compound chosen from the group of compounds comprising calcium sulphite and calcium sulphate, said method comprising supplying the oxidation gas by means of a gas sparger comprising an oxidation gas supply duct and at least a first oxidation gas supply nozzle, which is operative for distributing the oxidation gas in the slurry of said tank, said oxidation gas supply duct having a characteristic cross-sectional measure, such as a diameter, at said first oxidation gas supply nozzle, said method comprising spraying a liquid containing water towards said first oxidation gas supply nozzle from a spraying position located a distance of maximum 5 times said characteristic cross-sectional measure from said first oxidation gas supply nozzle.

An advantage of this method is that the gas sparger is kept clean from deposits for a long time, such that maintenance stops can be planned to occur less often, compared to the methods of the prior art.

According to one embodiment the total amount of water sprayed towards all of the oxidation gas supply nozzles of the gas sparger is larger than the amount of water required to saturate the oxidation gas with water vapour. An advantage of this embodiment is that it is ensured that the amount of liquid supplied will be sufficient for saturating the oxidation gas with water vapour, and for flushing the gas supply duct.

According to one embodiment the total amount of water sprayed towards all of the oxidation gas supply nozzles of the gas sparger amounts to at least 0.025 kg of water per kg of dry oxidation gas. An amount of water of less than 0.025 kg of water per kg of dry oxidation gas has been found to yield a less efficient flushing of the gas supply duct and the oxidation gas supply nozzles.

According to one embodiment the total amount of water sprayed towards all of the oxidation gas supply nozzles of the gas sparger amounts to less than 10 kg of water per kg of dry oxidation gas. An amount of water of more than 10 kg of water per kg of dry oxidation gas has been found to increase the operating costs, without further improving the flushing of the gas supply duct and the oxidation gas supply nozzles.

Further objects and features of the present invention will be apparent from the description and the claims.

BRIEF DESCRIPTION OF THE DRAWINGS

The invention will now be described in more detail with reference to the appended drawings in which.

DESCRIPTION OF PREFERRED EMBODIMENTS

Figure 1:
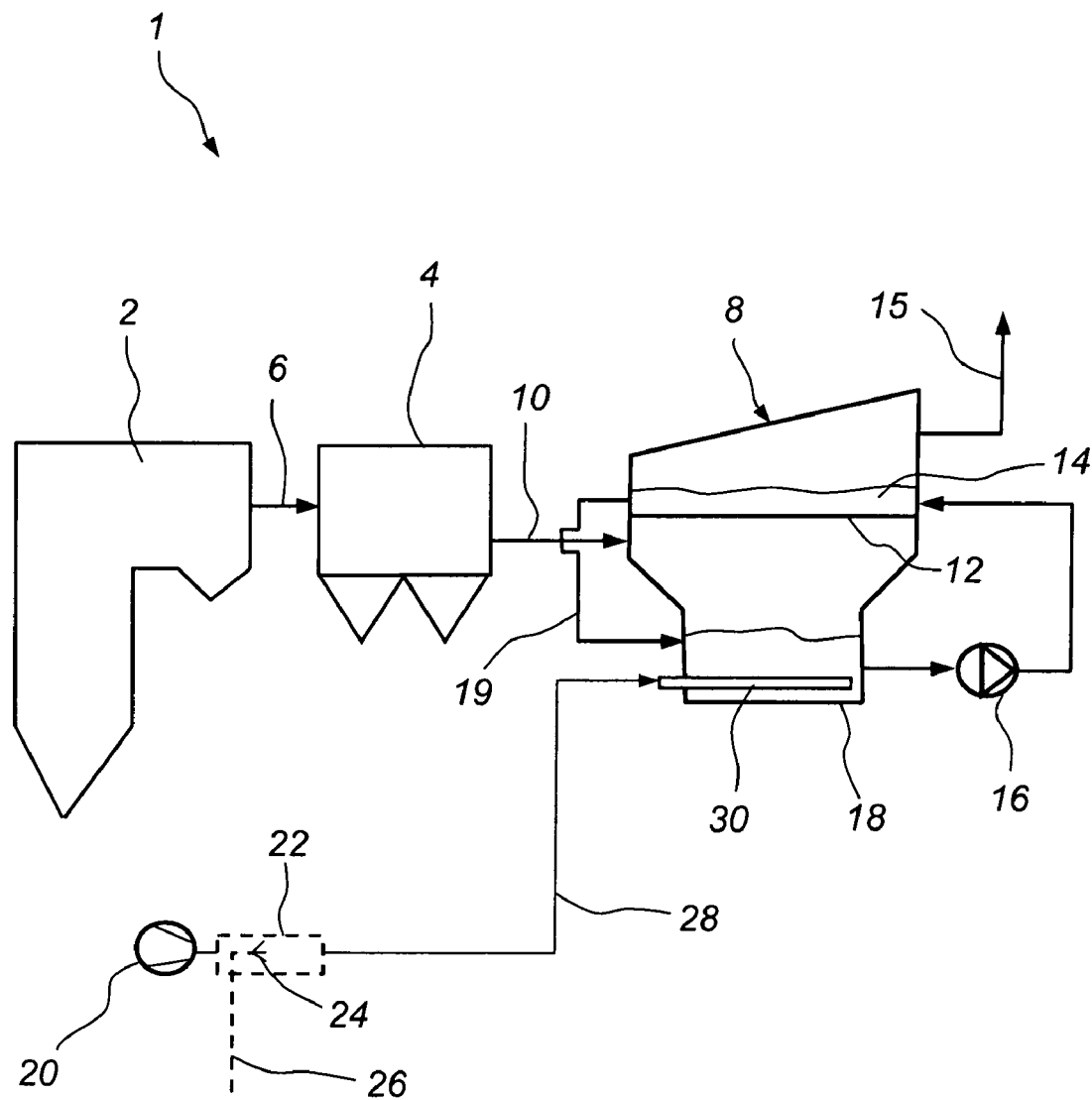
FIG. 1 is a schematic side view of a power plant.

FIG. 1 is a schematic side view and illustrates a power plant 1. The power plant 1 comprises a boiler 2 in which a fuel, such as coal or oil, is combusted. The combustion of the fuel generates a process gas in the form of a flue gas. Sulphur species contained in the coal or oil will form sulphur dioxide, $SO_2$, which will form part of the flue gas. The flue gas is forwarded from the boiler 2 to an electrostatic precipitator 4 via a duct 6. The electrostatic precipitator 4, an example of which is described in U.S. Pat. No. 4,502,872, serves to remove dust particles from the flue gas.

The flue gas, from which most of the dust particles have been removed, is then forwarded to a wet scrubber 8 via a duct 10. The wet scrubber 8 comprises an apertured plate 12. The flue gas is made to flow vertically upwards through the apertured plate 12 and through a flowing layer 14 of an absorption slurry which flows over the apertured plate 12. A pump 16 is operative for pumping the slurry from a recirculation tank 18 to the top of the apertured plate 12. The slurry then flows over the apertured plate 12, in the form of the flowing layer 14, and is then returned to the recirculation tank 18 via a return pipe 19. The cleaned flue gas leaves the wet scrubber 8 via a duct 15. A detailed description of one preferred embodiment of a wet scrubber can be found in WO 2005/007274.

While passing through the flowing layer 14 of the absorption slurry the sulphur dioxide, $SO_2$, of the flue gas reacts with limestone, $CaCO_3$, which is supplied to the slurry from a silo, not illustrated in FIG. 1 for reasons of clarity of illustration. The reaction between the sulphur dioxide and the limestone contained in the slurry can be summarized by the following reaction:

$$CaCO_3(s)+SO_2(g) \Rightarrow CaSO_3(aq)+CO_2(g) \qquad [1.1]$$

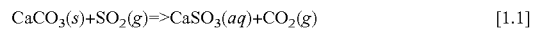

The calcium sulphite generated by this reaction is not a desired end product. For that reason an oxidation gas containing oxygen is supplied to the recirculation tank 18. The oxidation gas containing oxygen would normally be compressed ambient air, containing about 20% of oxygen, but could also, as alternative, be pure oxygen gas, or another gas containing oxygen. The oxygen supplied to the recirculation tank 18 reacts with the calcium sulphite to form calcium sulphate, i.e., gypsum, $CaSO_4$, in accordance with the following reaction:

$$CaSO_3(aq)+\tfrac{1}{2}O_2(g) \Rightarrow CaSO_4(s) \qquad [1.2]$$

Gypsum is a desired end-product and can be reused, for example in the manufacturing of gypsum board. Some of the involved compounds, e.g., limestone, calcium sulphite, and calcium sulphate, exist, at least to some extent, in solid form in the slurry. Thus, the absorption slurry circulating in the wet scrubber 8 comprises a dispersion of solid particles in a liquid, normally water.

A compressor 20 is operative for compressing ambient air to a pressure of typically 1-3 bar (O), i.e., to a pressure of 1-3 bar above ambient pressure. The operation of the compressor 20 increases the temperature of the compressed ambient air to typically 70-90° C. To avoid injuries, caused by hot surfaces, a cooling chamber 22 may optionally be provided immediately after the compressor 20. A water nozzle 24 injects water, supplied via a pipe 26, into the cooling chamber 22. The compressed air leaving the cooling chamber 22 via a transport pipe 28 has a temperature of, typically, 30-50° C., which means that the risk of burn injuries to operating personnel is avoided. The compressed air is forwarded to a gas sparger 30, which is operative for distributing the compressed air into the slurry contained in the recirculation tank 18.

Figure 2:
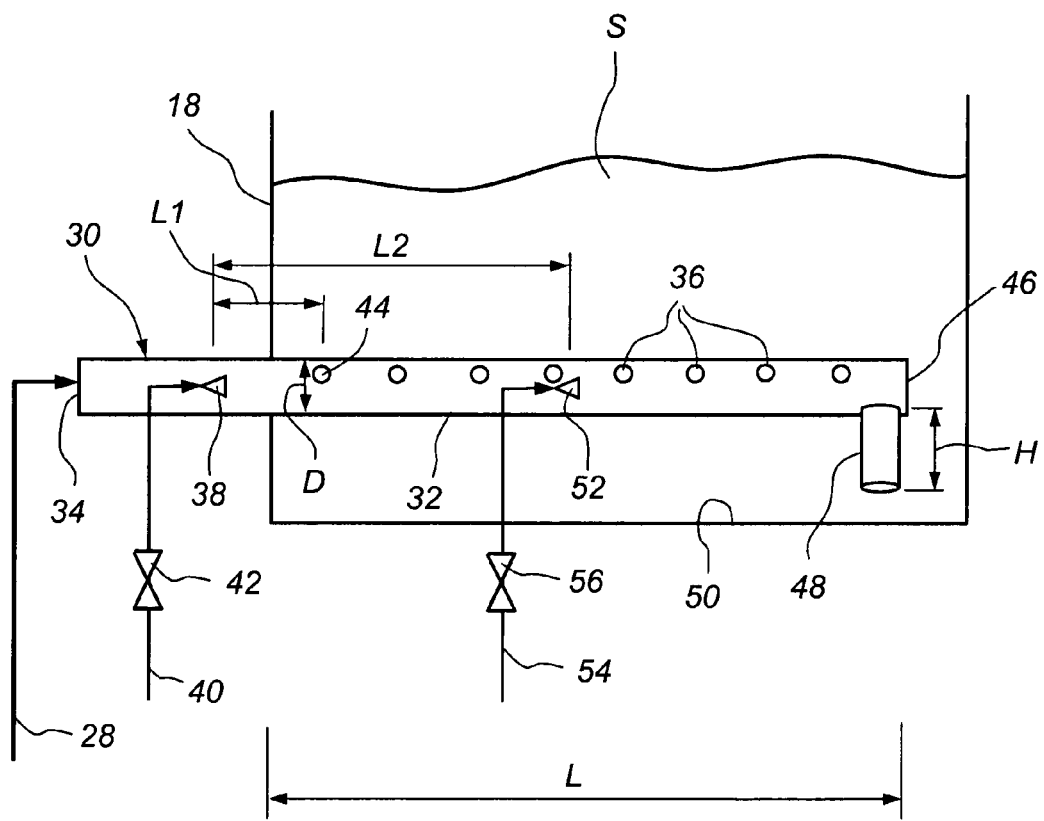
FIG. 2 is a schematic side view of a gas sparger in accordance with a first embodiment of the present invention.

FIG. 2 illustrates the gas sparger 30 in more detail. The gas sparger 30 comprises an oxidation gas supply duct 32, which is shown in cross-section and which has the form of an elongated circular tube with a diameter D of typically 30-300 mm, and a total length L inside the recirculation tank 18 of typically 1-4 meters. As can be seen from FIG. 2, the transport pipe 28 is connected to a first end 34 of the gas supply duct 32. A number of oxidation gas supply nozzles 36 are located along the length of the gas supply duct 32, at the inside of the recirculation tank 18. Typically each such oxidation gas supply nozzle 36 is a cylindrical opening formed in the wall of the gas supply duct 32. The diameter of the respective oxidation gas supply nozzle 36 is typically 6-30 mm. The compressed air supplied via the transport pipe 28 enters the gas supply duct 32 via its first end 34 and is forwarded along the gas supply duct 32 to the gas supply nozzles 36. The compressed air then leaves the gas supply duct 32 via the gas supply nozzles 36 and becomes mixed with the slurry, denoted S in FIG. 2, contained in the recirculation tank 18, to participate in the oxidation reaction, described hereinbefore and denoted [1.2].

A first liquid supply nozzle 38 is arranged inside the oxidation gas supply duct 32 and is operative for spraying a liquid containing water towards the oxidation gas supply nozzles 36. A pipe 40 is operative for supplying such liquid, which would typically be process water of the normal water supply system of the power plant, to the first liquid supply nozzle 38. A valve 42 is arranged on the pipe 40 and is operative for controlling the flow of water to the first liquid supply nozzle 38. The first liquid supply nozzle 38 is located a first distance L1 from a first oxidation gas supply nozzle 44, such first oxidation gas supply nozzle 44 being the first of the gas supply nozzles 36 as seen along the transport direction of the compressed air, which enters the gas supply duct 32 at its first end 34. The first distance L1 is maximum 5 times the characteristic cross-sectional measure, which in the case of a circular tube is the diameter D, of the gas supply duct 32 at said first oxidation gas supply nozzle 44. Hence, if the gas supply duct 32 has, as its characteristic cross-sectional measure, a diameter D of 50 mm at the first oxidation gas supply nozzle 44, then the first distance L1 is maximum 5×50 mm=250 mm. Thus, the first liquid supply nozzle 38 should be located a first distance L1 of maximum 250 mm upstream of the first oxidation gas supply nozzle 44.

The water supplied by the first liquid supply nozzle 38 serves the purposes of saturating the compressed air with water vapour, and to flush the gas supply nozzles 36 and the inside of the gas supply duct 32 with water. By fulfilling these two purposes, the risk of solid material, such as gypsum and calcium sulphite, being deposited in, or around, the gas supply nozzles 36 and inside the gas supply duct 32 is minimized. Such deposition could cause a reduced oxidation efficiency of the gas sparger 30, and may even completely block the gas sparger 30, such that no oxidation gas at all can be supplied to the recirculation tank 18. The fact that the compressed air becomes saturated by water vapour decreases the risk of drying slurry droplets that end up inside the gas supply duct 32, or at the periphery of the gas supply nozzles 36, such drying posing a risk of leaving a solid residue inside the gas supply duct 32, or at the gas supply nozzles 36, respectively. The fact that the first liquid supply nozzle 38 flushes the gas supply nozzles 36 and the inside of the gas supply duct 32 with a liquid removes any such slurry droplets before they have any chance of sticking to the inside of the gas supply duct 32, or to the gas supply nozzles 36.

At a second end 46 of the gas supply duct 32, such second end 46 being opposite to the first end 34, an optional drain pipe 48 is formed. The drain pipe 48 extends vertically downwards from the gas supply duct 32 towards the bottom 50 of the recirculation tank 18. The total length H of the drain pipe 48 is chosen such that the liquid column corresponding to the length H corresponds to a higher pressure drop than the pressure drop of the gas supply nozzles 36. Hence, under normal operating conditions, the compressed air will only leave the gas supply duct 32 via the gas supply nozzles 36, and not via the drain pipe 48. However, the flushing liquid sprayed via the first liquid supply nozzle 38, and any slurry that has been flushed away by means of spraying such flushing liquid, will be drained out of the gas supply duct 32 via such drain pipe 48. In the absence of a drain pipe 48 the flushing liquid will instead drain out via the gas supply nozzles 36.

The flushing capacity of the sprayed flushing liquid decreases by the distance from the first liquid supply nozzle 38. To this end, it is sometimes preferable to arrange more than one liquid supply nozzle inside the gas supply duct 32. As illustrated in FIG. 2 a second liquid supply nozzle 52 has been arranged downstream of the first liquid supply nozzle 38. A pipe 54 is operative for supplying a flushing liquid to the second liquid supply nozzle 52, and a valve 56 is arranged on the pipe 54 to control such flow of flushing liquid. A second distance L2 between the first liquid supply nozzle 38 and the second liquid supply nozzle 52 is preferably maximum 25 times the characteristic cross-sectional measure, i.e., the diameter D of the gas supply duct 32. Hence, if the diameter D of the gas supply duct 32 is 50 mm, the second liquid supply nozzle 52 should be located a second distance L2 of maximum 25×50 mm=1250 mm downstream of the first liquid supply nozzle 38.

To achieve both a saturation of the oxidation gas with water vapour, and a flushing effect, the total amount of water sprayed towards all of the oxidation gas supply nozzles 36 of the gas sparger 30 by means of the first and second liquid supply nozzles 38, 52 is larger than the amount of water required to saturate the oxidation gas with water vapour. Preferably, the total amount of water sprayed towards all of the oxidation gas supply nozzles 36, 44 of the gas sparger 30 amounts to at least 0.025 kg of water per kg of dry oxidation gas. Hence, if the amount of compressed air supplied to the gas sparger 30 amounts to 1000 kg dry air/h, then the amount of water supplied to the gas sparger 30 via the first and second liquid supply nozzles 38, 52 should be, in total, at least 0.025× 1000=25 kg of water/h. Preferably, the total amount of water sprayed towards all of the oxidation gas supply nozzles 36, 44 of the gas sparger 30 amounts to less than 10 kg of water per kg of dry oxidation gas. Hence, if the amount of compressed air supplied to the gas sparger 30 amounts to 1000 kg dry air/h, then the total amount of water supplied to the gas sparger 30 via the first and second liquid supply nozzles 38, 52 should preferably be less than 10×1000=10 000 kg of water/h.

As can be seen from a reference to FIG. 2 the oxidation gas supply duct 32 is substantially straight between the location of said first liquid supply nozzle 38 and the location of said first oxidation gas supply nozzle 44. Hence, the first liquid supply nozzle 38 "sees" the first oxidation gas supply nozzle 44, since there are no bends between them, which improves the flushing efficiency.

The first and second liquid supply nozzles 38, 52 preferably operate on a continuous basis, such that flushing liquid is continuously supplied to the gas supply duct 32. It is also possible, however, to operate the first and second liquid supply nozzles 38, 52 on a semi-continuous basis. In such a case the liquid supply nozzles 38, 52 should be in operation at least once every 30 minutes, and for a duration of at least 2 minutes per 30 minutes.

The first and second liquid supply nozzles 38, 52 are preferably so-called full-cone nozzles, and preferably have a spray angle of less than 100°. An example of a useful liquid supply nozzle is ⅛" GA-2 50° which is available from Spraying Systems Co., Wheaton, Ill., USA.

Figure 3:
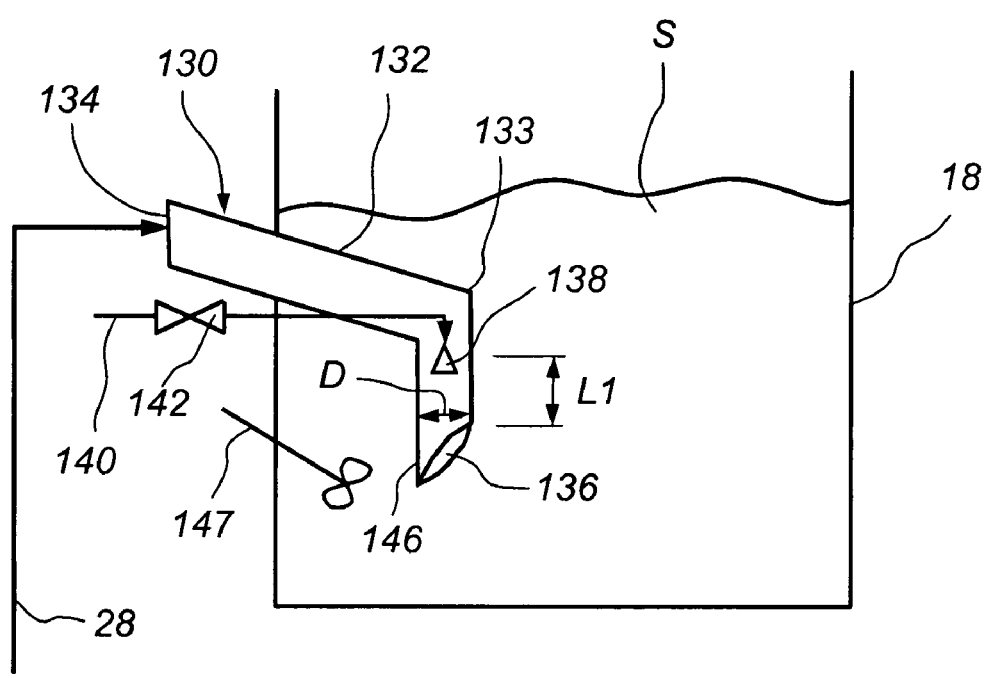
FIG. 3 is a schematic side view of a gas sparger in accordance with a second embodiment of the present invention.

FIG. 3 illustrates a gas sparger 130 in accordance with an alternative embodiment. The transport pipe 28 and the recirculation tank 18 containing slurry S are similar to those described hereinbefore with reference to FIG. 2, and are not described in any further detail. The gas sparger 130 comprises an oxidation gas supply duct 132 which comprises a cylindrical tube having the shape of a "leg", with a knee 133. As alternative, the oxidation gas supply duct could be a straight cylindrical tube, without any "knee". The transport pipe 28 is operative for forwarding compressed air at a first end 134 of the gas supply duct 132. Downstream of the knee 133, as seen with reference to the transport direction of the compressed air, a first oxidation gas supply nozzle 136 is located. The first oxidation gas supply nozzle 136 is simply formed by cutting off the gas supply duct 132 at its second end 146. As can be seen from a reference to FIG. 3, such cutting of the gas supply duct 132 has been made at an angle of about 45° to the longitudinal direction of the gas supply duct 132, at the second end 146. An agitator 147 has been arranged in the recirculation tank 18 adjacent to the gas supply nozzle 136. The agitator 147 is operative for forcing slurry into the area of the first oxidation gas supply nozzle 136 to improve the mixing between the slurry and the compressed air.

A first liquid supply nozzle 138 is arranged inside the oxidation gas supply duct 132, downstream of the knee 133, and is operative for spraying a liquid containing water towards the first oxidation gas supply nozzle 136. A pipe 140 is operative for supplying a flushing liquid to the first liquid supply nozzle 138, and a valve 142 is arranged on the pipe 140 to control such flow of flushing liquid. The first liquid supply nozzle 138 is located a first distance L1 from the first oxidation gas supply nozzle 136. The distance L1 is maximum 5 times the characteristic cross-sectional measure, which in the case of a circular tube is the diameter D, of the gas supply duct 132 at said first oxidation gas supply nozzle 136, i.e., L1 is maximum 5 times the diameter D. As can be seen from a reference to FIG. 3, the flushing liquid supplied by the first liquid supply nozzle 138 will drain directly into the recirculation tank 18 via the first oxidation gas supply nozzle 136.

Figure 4:
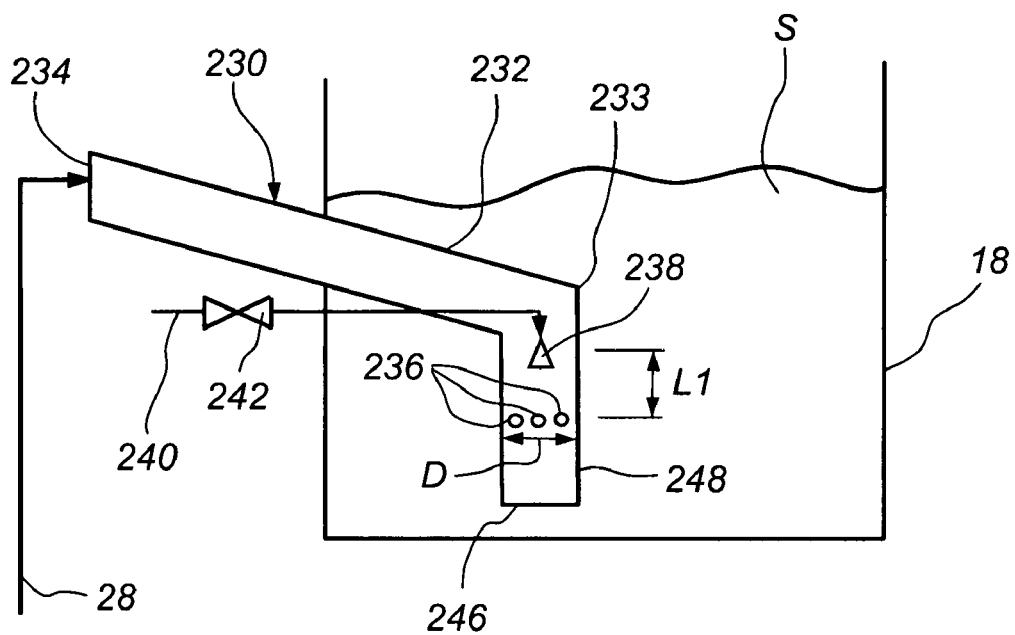
FIG. 4 is a schematic side view of a gas sparger in accordance with a third embodiment of the present invention.

FIG. 4 illustrates a gas sparger 230 in accordance with a further alternative embodiment. The transport pipe 28 and the recirculation tank 18 containing slurry S are similar to those described hereinbefore with reference to FIG. 2, and are not described in any further detail. The gas sparger 230 comprises an oxidation gas supply duct 232 which comprises a cylindrical tube having the shape of a "leg", with a knee 233. As alternative, the oxidation gas supply duct could be a straight cylindrical tube, without any "knee". The transport pipe 28 is operative for forwarding compressed air at a first end 234 of the gas supply duct 232. Downstream of the knee 233, as seen with reference to the transport direction of the compressed air, a number of gas supply nozzles 236 are located. The gas supply nozzles 236 have been formed by drilling holes in the gas supply duct 232. As can be seen, a second end 246 of the gas supply duct 232 is located at a distance from the gas supply nozzles 236.

A first liquid supply nozzle 238 is arranged inside the oxidation gas supply duct 232, downstream of the knee 233, and is operative for spraying a liquid containing water towards the oxidation gas supply nozzles 236. A pipe 240 is operative for supplying a flushing liquid to the first liquid supply nozzle 238, and a valve 242 is arranged on the pipe 240 to control such flow of flushing liquid. The first liquid supply nozzle 238 is located a first distance L1 from all of the oxidation gas supply nozzles 236. The distance L1 is maximum 5 times the characteristic cross-sectional measure, which in the case of a circular tube is the diameter D, of the gas supply duct 232 at said oxidation gas supply nozzles 236, i.e., L1 is maximum 5 times the diameter D. While the entire flow of the oxidation gas will leave the gas supply duct 232 via the oxidation gas supply nozzles 236, most of the flushing liquid supplied by means of the first liquid supply nozzle 238 will leave the gas supply duct 232 via an opening at the second end 246. In fact the gas supply duct 232 is simply formed as a tube being open at its second end 246, such second end 246 thereby forming a drain pipe 248 for draining flushing liquid.

It will be appreciated that numerous modifications of the embodiments described above are possible within the scope of the appended claims.

Above it has been described that process water, which is a pure water, almost of drinking water quality, is utilized for flushing the gas sparger 30 by means of being sprayed by the liquid supply nozzles 38, 52. It will be appreciated that other types of liquids, comprising water, could also be utilized for the flushing. For example, various liquid recirculates of the wet scrubber, such as gypsum filter drain liquid, could also be utilized as flushing liquid. It would even be possible to utilize the slurry of the recirculation tank 18 as flushing liquid, as long as the amount of water in the slurry supplied is more than what is needed for saturating the compressed air with water vapour. Normally, however, it is preferable to utilize a rather pure water, such as drinking water or process water.

Above it has been described that the characteristic cross-sectional measure of the gas supply duct 32 is the diameter, D, at the first oxidation gas supply nozzle 44. If a gas supply duct is, as alternative, shaped as a tube having a square cross-section, then the characteristic cross-sectional measure would instead be the side of such square cross-section. If a gas supply duct is, as a further alternative, shaped as a tube having a triangular cross-section, then the characteristic cross-sectional measure would be the shortest height of such triangular cross-section. Furthermore, if a gas supply duct is, as a still further alternative, shaped as a tube having a rectangular cross-section, then the characteristic cross-sectional measure would be half of the sum of the shortest side and the longest side of such rectangular cross-section.

Hereinbefore it has been described, with reference to FIG. 1, that the wet scrubber 8 comprises an apertured plate 12 over which a flowing layer 14 flows. It will be appreciated that a gas sparger in accordance with the present invention can be utilized in other types of wet scrubbers as well. One such type is the tower scrubber, in which slurry is atomized by means of slurry nozzles. The flue gas is forwarded vertically upwards through the tower and is brought into contact with the atomized slurry. The atomized slurry is collected in a recirculation tank, which could be provided with a gas sparger of the type described hereinbefore. An example of a wet scrubber of the tower type can be found in EP 0 162 536 A1.

To summarize, a gas sparger 30 is operative for supplying an oxidation gas containing oxygen to a tank 18 of a wet scrubber 8 which is operative for removing sulphur dioxide from a process gas by means of a slurry S. The gas sparger 30 is provided with at least a first liquid supply nozzle 38, which is located inside the oxidation gas supply duct 32 and is operative for spraying a liquid containing water towards the first oxidation gas supply nozzle 44. The oxidation gas supply duct 32 has a characteristic cross-sectional measure, such as a diameter D, at said first oxidation gas supply nozzle 44. The first liquid supply nozzle 38 is located a distance L1 of maximum 5 times said characteristic cross-sectional measure D from said first oxidation gas supply nozzle 44.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A gas sparger for supplying an oxidation gas to a tank of a wet scrubber, comprising:
   an oxidation gas supply duct equipped with at least one oxidation gas supply nozzle for distributing an oxidation gas containing oxygen to a slurry within a wet scrubber tank, said slurry comprising at least one compound selected from a group consisting of calcium sulphite, calcium sulphate and combinations thereof;

at least one liquid supply nozzle located inside said oxidation gas supply duct for spraying a liquid containing water toward said oxidation gas supply nozzle; and said oxidation gas supply duct having a cross-sectional measurement at said oxidation gas supply nozzle, such that said liquid supply nozzle is positioned a maximum distance of 5 times said cross-sectional measurement from said oxidation gas supply nozzle.

2. A gas sparger according to claim 1, wherein the oxidation gas supply duct is substantially straight between said liquid supply nozzle and said oxidation gas supply nozzle.

3. A gas sparger according to claim 1, wherein a second liquid supply nozzle is positioned a maximum distance of 25 times said cross-sectional measurement from said liquid supply nozzle.

4. A gas sparger according to claim 1, wherein said oxidation gas supply duct includes a drain pipe for draining liquid therefrom.

5. A gas sparger according to claim 1, wherein said liquid supply nozzle is a nozzle with a spray angle of less than 100°.

6. A method of using a gas sparger to supply an oxidation gas to a tank of a wet scrubber, comprising:

supplying an oxidation gas containing oxygen to a slurry within a wet scrubber tank using an oxidation gas supply duct equipped with at least one oxidation gas supply nozzle, said slurry comprising at least one compound selected from a group consisting of calcium sulphite, calcium sulphate and combinations thereof; and supplying liquid containing water to at least one liquid supply nozzle located inside said oxidation gas supply duct for spraying said liquid toward said oxidation gas supply nozzle, with oxidation gas supply duct having a cross-sectional measurement at said oxidation gas supply nozzle, such that said liquid supply nozzle is positioned a maximum distance of 5 times said cross-sectional measurement from said oxidation gas supply nozzle.

7. A method according to claim 6, wherein the total amount of liquid sprayed toward said oxidation gas supply nozzle is more than that required to saturate said oxidation gas with water vapour.

8. A method according to claim 6, wherein the total amount of liquid sprayed toward said oxidation gas supply nozzle is at least 0.025 kg per kg of dry oxidation gas.

9. A method according to claim 6, wherein the total amount of liquid sprayed toward said oxidation gas supply nozzle is less than 10 kg per kg of dry oxidation gas.

* * * * *